Nov. 7, 1933.  M. STUCATUR  1,933,603
CONTROLLING MECHANISM FOR TRANSMISSIONS
Original Filed Aug. 8, 1923  6 Sheets-Sheet 1
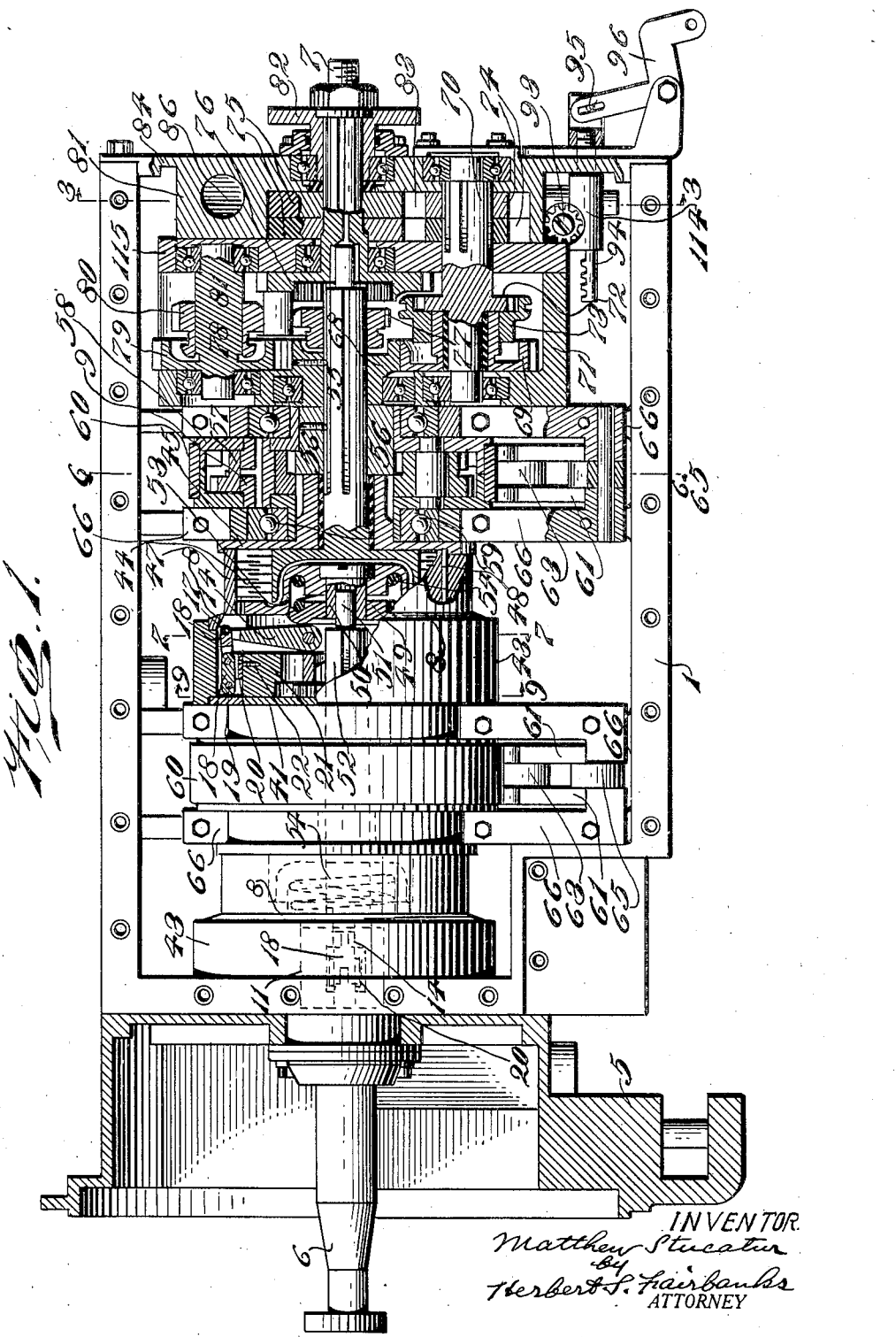
INVENTOR.
Matthew Stucatur
By Herbert S. Fairbanks
ATTORNEY

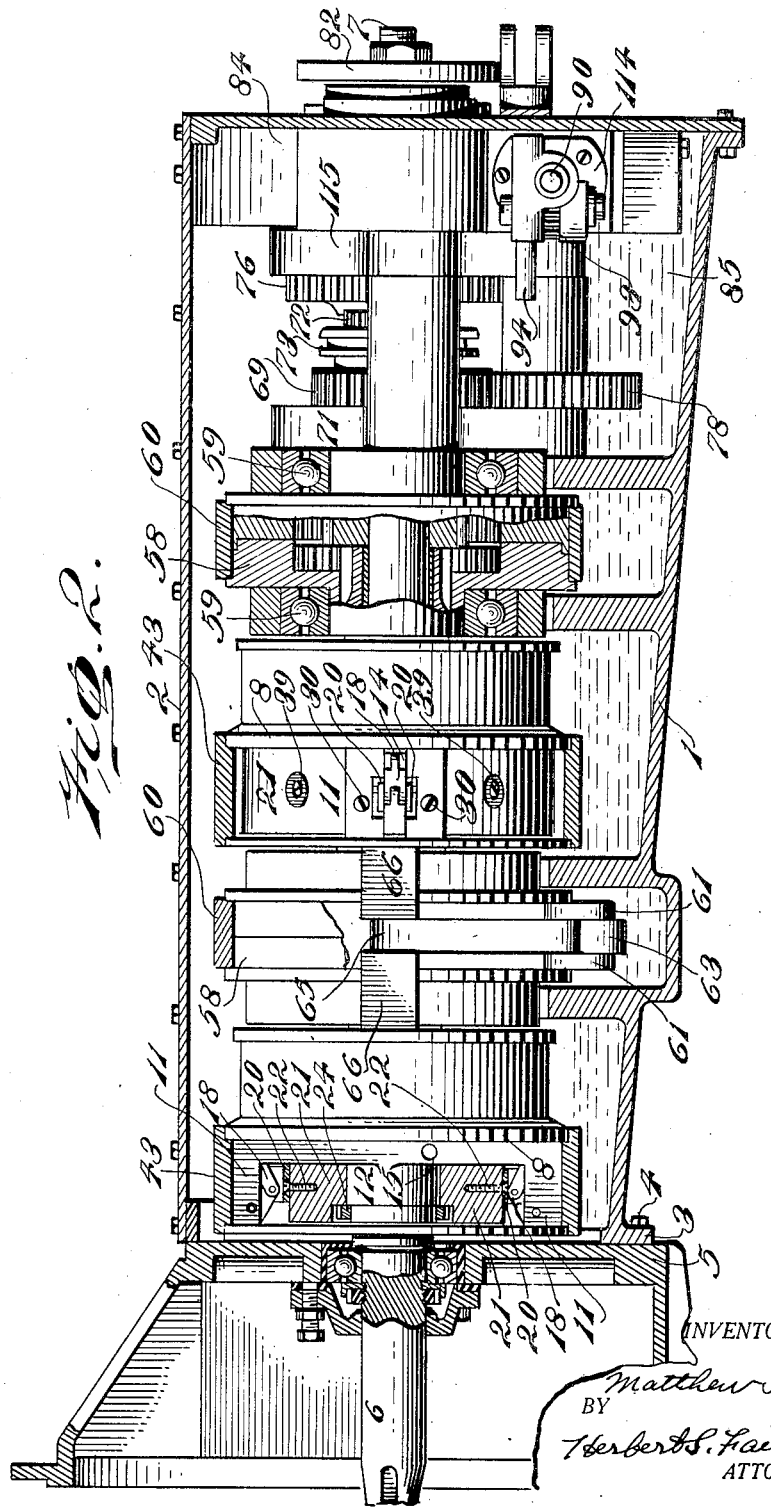

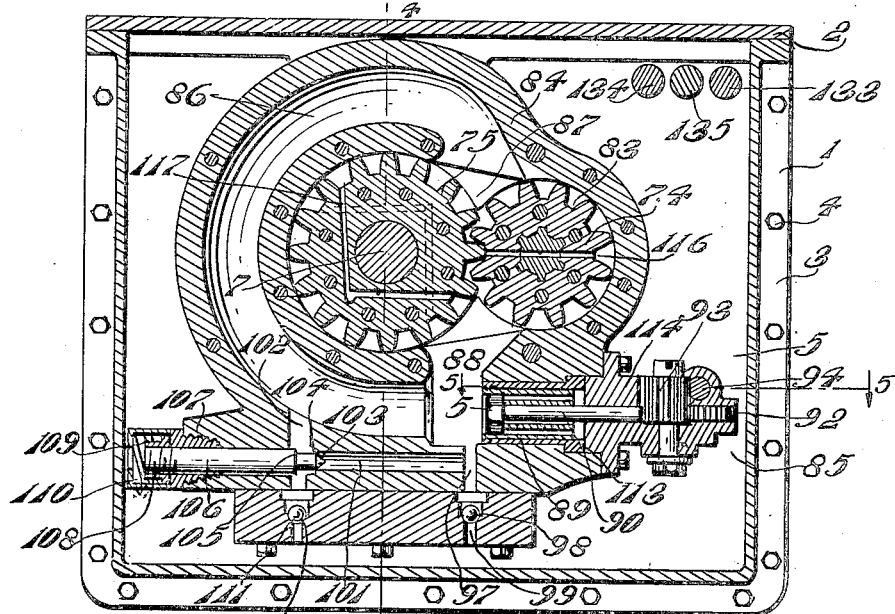
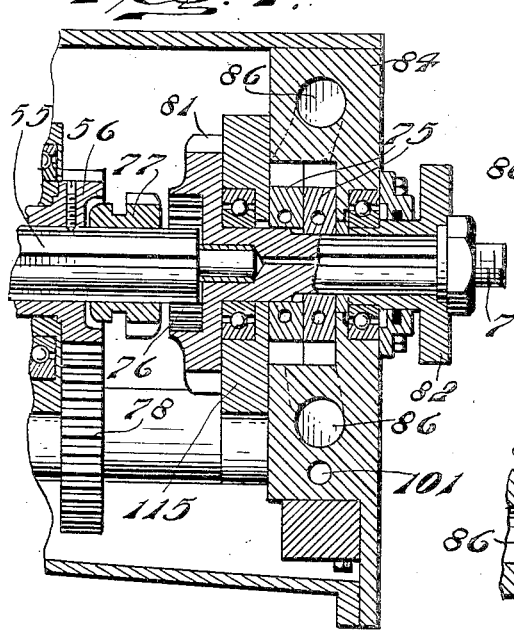
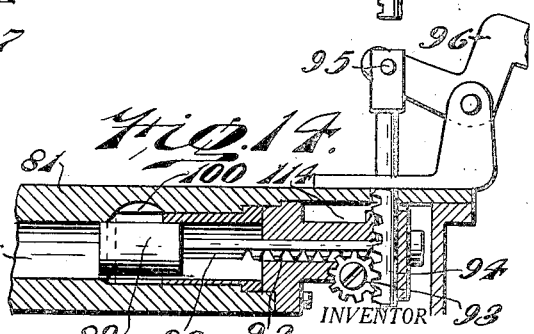

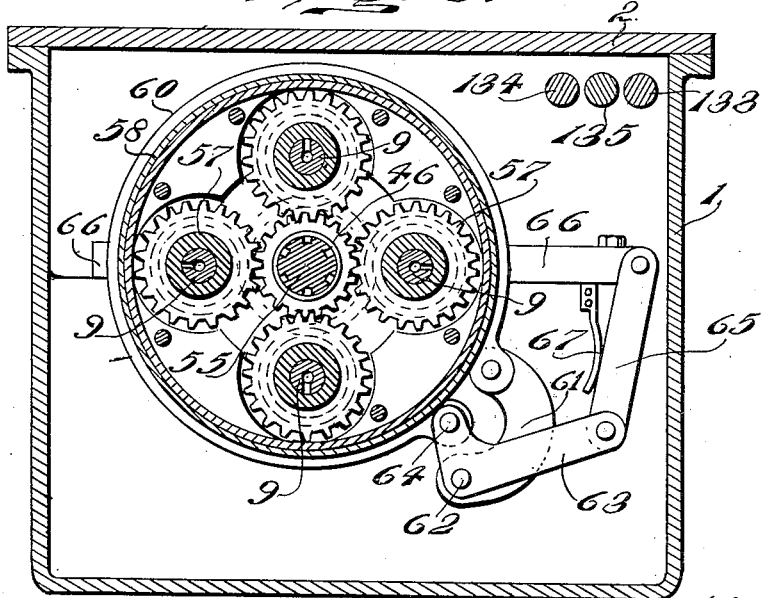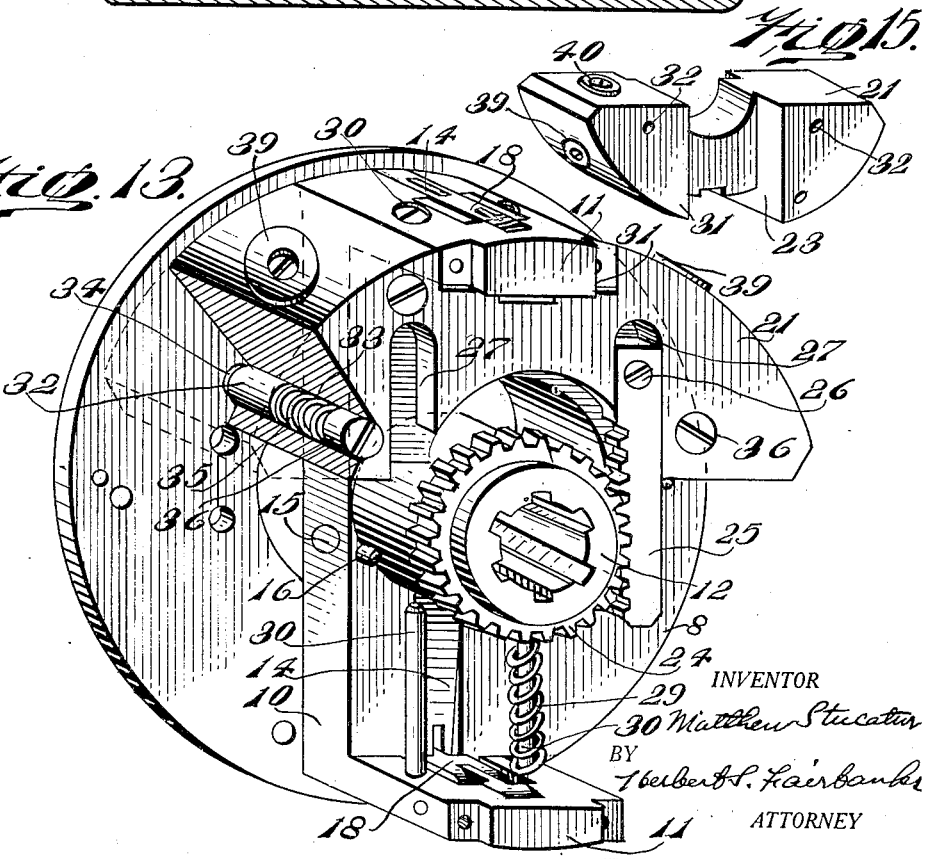

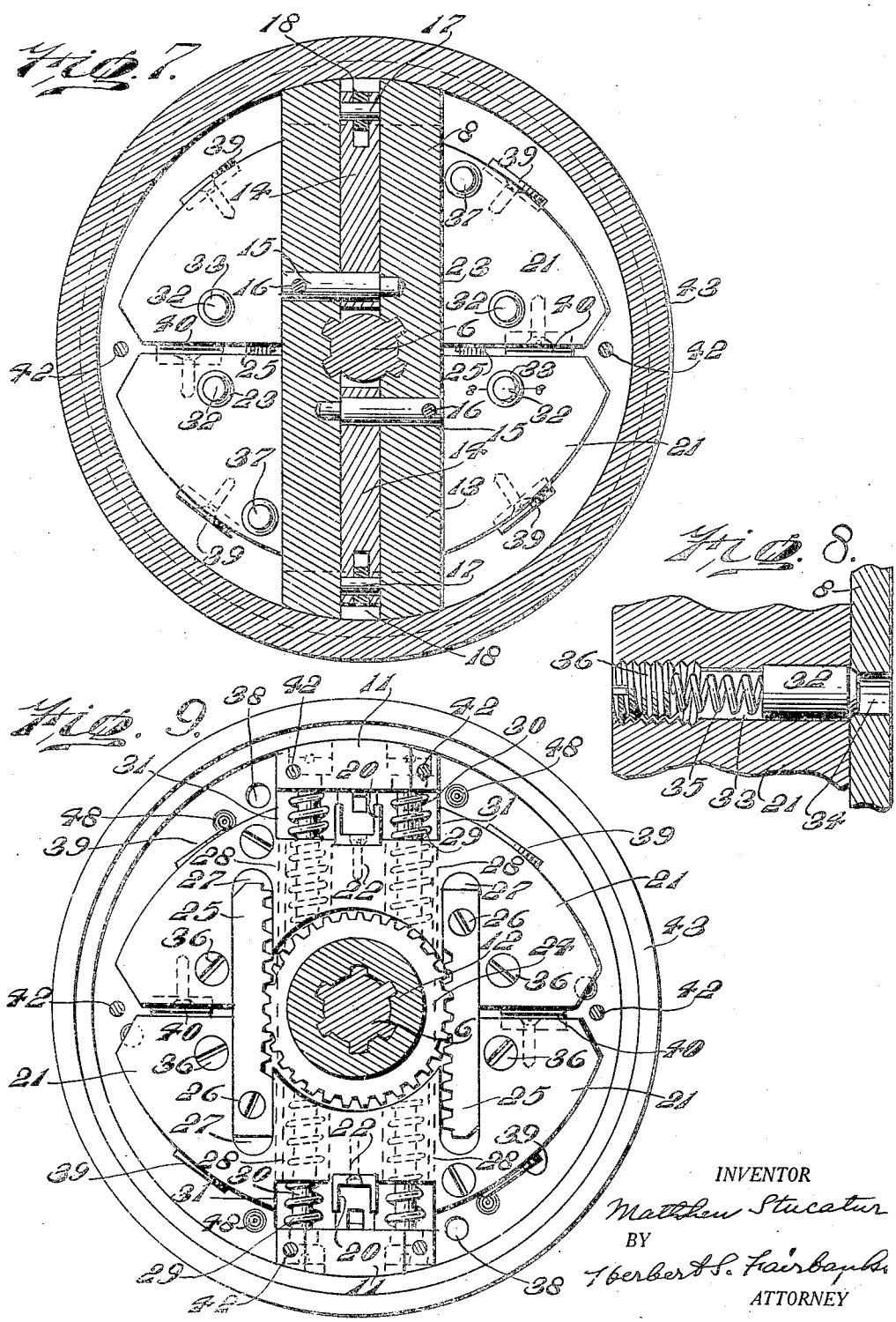

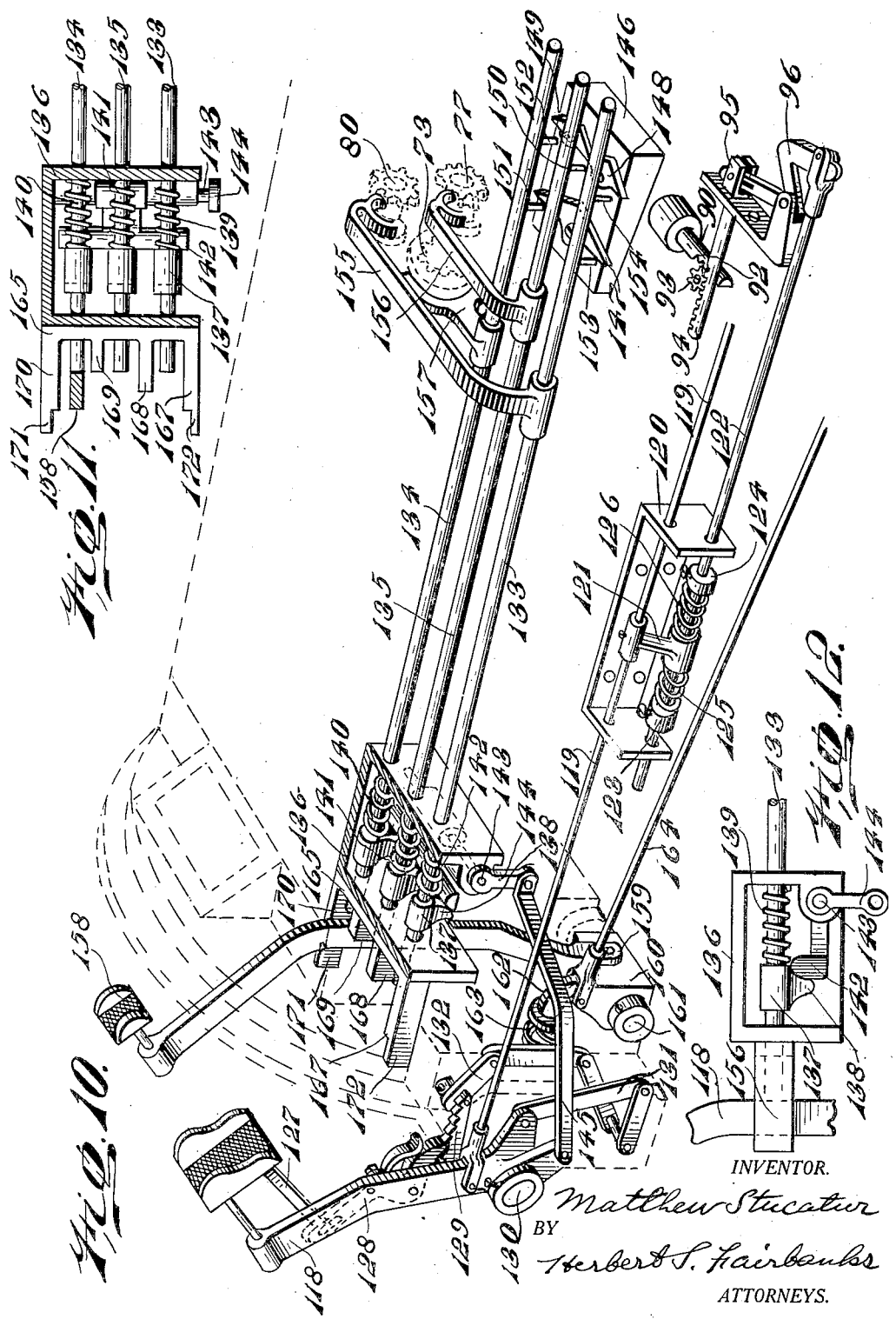

Patented Nov. 7, 1933

1,933,603

UNITED STATES PATENT OFFICE 1,933,603

CONTROLLING MECHANISM FOR TRANSMISSIONS

Matthew Stucatur, Philadelphia, Pa., assignor, by mesne assignments, to New Products Corporation, a corporation of Delaware Original application August 8, 1923, Serial No. 656,404. Divided and this application January 18, 1929. Serial No. 333,313

7 Claims. (Cl. 192—4)

In my parent application Serial No. 656,404, filed August 8th, 1923, which has eventuated in Patent No. 1,706,553 dated March 26, 1929, I have described and broadly claimed a novel construction and arrangement of an automatic transmission.

My present application is a division of my parent application aforesaid and relates more particularly to the controlling mechanism of the transmission.

With the above in view, my invention comprehends in its broad and generic scope, a novel controlling mechanism for transmissions.

It further comprehends a novel construction and arrangement of controlling mechanism, wherein a clutch pedal is employed to control the fluid pump, the service brake and the main clutch mechanism. A brake and gear pedal control is provided which controls the back gearing, the operation at engine speed of the driven mechanism, and the operation of the reverse mechanism. This brake serves to lock the clutch pedal to prevent its operation when the gears are not properly shifted, and also controls the emergency brake. The construction is such that it is impossible to shift from reverse to a forward motion, or vice versa, without first applying the emergency brake.

Other novel features of construction and advantage will hereinafter more fully appear in the detailed description and the appended claims.

For the purpose of illustrating the invention, I have shown in the accompanying drawings a typical embodiment thereof which is at present preferred by me, since this embodiment will be found in practice to give satisfactory and reliable results. It is, however to be understood that the various instrumentalities of which my invention consists can be variously arranged and organized and my invention is not limited to the precise arrangement and organization of these instrumentalities as herein shown and described.

Figure 1 represents a top plan view of a transmission and controlling mechanism therefor, embodying my invention, and partly broken away, in order to more clearly illustrate certain features of the construction.

Figure 2 represents a vertical, longitudinal section of my device, certain of the parts being shown in section and certain of the parts in elevation.

Figure 3 represents a section on line 3—3 of Figure 1.

Figure 4 represents a section on line 4—4 of Figure 3.

Figure 5 represents a section on line 5—5 of Figure 3.

Figure 6 represents a section on line 6—6 of Figure 1.

Figure 7 represents a section on line 7—7 of Figure 1.

Figure 8 represents a section on line 8—8 of Figure 7.

Figure 9 represents a section on line 9—9 of Figure 1.

Figure 10 represents, in perspective, the controlling mechanism and certain of its adjuncts.

Figure 11 represents a sectional plan view of the locking mechanism seen in Figure 10.

Figure 12 represents a side elevation of the construction seen in Figure 11.

Figure 13 represents, in perspective, a portion of a governor unit.

Figure 14 represents a sectional view similar to that seen in Figure 5 but showing certain of the parts in a different relation to each other from that seen in Figure 5.

Figure 15 represents, in perspective and in detached position, a governor weight.

Similar numerals of reference indicate corresponding parts.

Referring to the drawings:—

This invention involves several different types of mechanisms which co-operate with each other, and come into action at the proper time, and I will, therefore, in the detailed description, describe such mechanisms, insofar as practicable, in the logical order in which they are brought into operation.

1 designates a casing within which is adapted to be contained and mounted the various working parts, the casing being provided with a cover 2, see Figure 3. This casing can be secured in position in any desired manner and when employed in conjunction with a motor driven vehicle, it would preferably be provided with a flange 3 at one end which would be secured by means of fastening devices 4, see Figure 3, to the clutch housing 5, see Figures 1 and 2. 6 designates the main driving shaft which carries in the usual manner any conventional type of a manually controlled main clutch which serves to connect and disconnect the transmission herein disclosed from the prime mover or engine.

7 designates the main driven shaft, which, in a motor driven vehicle is ordinarily operatively connected with the rear wheels of the vehicle to effect their rotation. These shafts 6 and 7 are suitably journalled in the casing 1.

The governor units

Each governor unit includes a governor proper, a train of reduction gearing, a clutch and what I call a "ratchet mechanism".

Referring now more particularly to Figures 1, 2, 7, 8 and 9, I will first describe the governor. 8 designates a guide plate which is keyed or otherwise fixed to the main driving shaft 6. The guide plate 8 is in the general form of a disc, see Figure 13, said plate having raised above its surface the radially disposed guide member 10 which at its outer end terminates in the outwardly extending flanges 11. The disc 8 has projecting from it the hub 12 adapted to receive the main driving shaft 6. The guide member 10 is slotted, as indicated at 13, in order to receive the links 14, see Figures 1, 7 and 13, said links being mounted on the pins 15 extending laterally into the guide plate 8 and fixed in position by means of the fastening devices 16. The outer ends of the links 14 have pivoted to them, as at 17, toggle links 18, one of which is pivoted at 19, see Figure 1, to the flanges 11 of the guide member 8.

The toggles have connected to them positive return links 20 which are operatively connected with the governor weights 21 by means of fastening devices 22 of any desired character. I provide in the present instance two governor weights for each governor unit. The construction and arrangement of these weights will be best understood by reference to Figures 7, 9 and 13, from which it will be seen that each governor weight is provided with a slot 23, which is adapted to fit over the guide member 10 and be freely slidable thereon and guided thereby, so that each weight has a radial movement under centrifugal action.

I also provide means for causing an equalizing movement of the weights, and, to this end, the hub 12, see Figure 9, has loosely mounted on it a pinion 24 which meshes with the oppositely disposed racks 25, each of which is fixed to its respective weight 21 by means of a fastening device 26 of any desired type. Each weight is slotted, as indicated at 27, see Figure 9, to permit the radial movement of the weights under centrifugal action.

It will be understood from Figure 9 that the racks are positioned within such slots 27, which provide clearance for the proper movement of the weights. The governor weights 21 are apertured, as indicated at 28, to receive the springs 29 which at their inner end bear against their respective governor weights, and at their outer end they bear against a flange 11. If desired, the rods 30 may be provided, which are encircled by the springs 29. The outer periphery of each governor weight 21 is recessed, as at 31, in order that it will clear the juxtaposed flange 11 of the guide plate 8.

Due to the equalizing mechanism provided, the two weights will move out uniformly under centrifugal action against the resistance of the springs 29, which latter facilitates the return movement of the weights to their initial or normal position, and such return movement is the same on each governor weight, due to the provision of the novel equalizing mechanism above described.

I provide a novel means for momentarily locking the governor weights in their extreme inward positions or in their extreme outward positions and thus prevent them from assuming during the operation an intermediate position. Each weight is provided at its inner portion with preferably a plurality of locking members 32 which are guided in apertures 33 opening through a side wall of a governor weight 21 and having their outer ends preferably bevelled in order to adapt them to enter the recesses or apertures 34 in the juxtaposed guide plate 8. These locking members 32 are retained in their outward position by means of springs 35, the tension of which can be adjusted by means of the adjustable screws 36 in threaded engagement with a governor weight 21. Each governor weight is also provided near its outer portion with a locking member 37, in the form of a plunger similar to that seen in Figure 8 and actuated in the same manner, and adapted to engage an aperture 38, see Figure 9, when the weights assume their extreme outward position.

I preferably employ cushioning members 39 to prevent any excessive shock or noise when a governor weight 21 reaches its extreme outward position, and I also employ similar cushioning devices 40 to compensate for any shock or noise which might occur when the weights reach their extreme inward position.

41 designates a cover plate see Figure 1, which is secured to the guide member 8 by means of fastening devices 42 best seen in Figure 9. When the cover plate 41 is in assembled position, it retains in position the housing ring 43, see Figures 1, 2, 7 and 9, it being noted that opposite sides of this ring on its inner face are recessed to provide for its proper co-fitting engagement with juxtaposed parts.

The links 14, see more particularly Figure 1, serve to automatically control a clutch 44 of any desired or conventional type, and which, for purpose of illustration, has been shown conventionally as consisting of a multiple disc type of clutch which bears at one end against a flange 45 connected with a gear 46, and this flange 45 together with a clutch housing 47 is fixed to the guide plate 8 by means of fastening devices 48, see Figure 1.

It will thus be seen that the gear 46 revolves in unison with the governor and the main drive shaft 6 to which it is connected. The links 14, see Figure 1, bear against a pressure transmitting member 49 which is in threaded engagement with an adjusting member 50 which is apertured to receive an extension 51 of a driving shaft section 52, and on which it is loosely mounted.

It will be understood that the number of shaft sections 52 employed will depend upon the number of governor units employed, and if only one unit is employed, the main driving shaft 6 will terminate in a section similar to 51 operatively connected with respect to the clutch in a manner which will now be described in connection with the construction as illustrated wherein a plurality of governor units are employed.

The adjustable member 50 has slidably mounted on it, so that it can have longitudinal movement with respect to the member 49, a thrust transmitting member 53 which bears against one of the discs of a multiple disc clutch. A spring 54 is interposed between the thrust transmitting member 49 and 53 in order to cushion the shock when the clutch is being engaged and compensate for any wear which may take place during the life of the transmission. The driven member of the clutch is connected with a driven shaft section 55, see Figure 1, and on this shaft section 55 the driving gear 46 is loosely mounted. The shaft 55 has fixed to it a driven gear 56 which is driven by means of compound gears 57 which are driven by the driving gear 46. The hubs of the gears 46 and 56 form a support for the gear drum 58 which co-operates with the anti-friction bearing 59 and the compound gears 57 are loosely mounted on the shafts 9 journalled in the drum 58.

The outer periphery of the gear drum 58 is recessed to receive a brake band 60. One free end of this brake band 60, see Figure 1, has pivoted to it the ends of links 61, the opposite ends of which are pivoted at 62 to a lever 63, one end of which latter is pivoted at 64 to the opposite free end of the brake band 60. The lever 63 is connected by means of a link 65 with a boss 66 which is fixed to the casing 1 and forms a part of the bearings. A spring 67 has one end connected with a suitable fixed point and its free end has a bearing against the link 65, so that the brake band 60 is maintained in proper position with respect to the brake drum portion of the gear casing and holds the parts in working relationship and also compensates for wear.

The driven shaft 55 is operatively intergeared with the main driven shaft 7 in any desired or conventional manner, and, for purposes of illustration, I have shown the driven shaft 55 as having fixed to it a gear 68, which is in mesh with a gear 69 loosely mounted on a shaft 70 journalled in the housing 71, and which has fixedly mounted on it a gear 72.

The hub of the gear 69 has splined to it a clutch 73, the teeth of which can be brought into mesh with the teeth of the gear 72, whereby the shaft 70 will be driven. This shaft 70 has also mounted on it a herring-bone gear 74, which is in mesh with a herring-bone gear 75 which is fixed on the driven shaft 7. It will thus be seen from the gearing just described that the driven shaft 7 will be driven at a slower speed through such back gearing. The shaft 7 has fixed with respect to it an internal gear 76, into mesh with which a clutch gear 77 can be moved, said gear 77 being keyed to the shaft 55 and provided with means under the control of the operator for adjusting it. The gear 68 meshes with an idler 78, which, in turn, is in mesh with a gear 79, to the hub of which is keyed a clutch gear 80, which may be brought into engagement with the external teeth 81 of the internal gear 76, which is connected to the main driven shaft 7. The main driven shaft 7 is provided with a flanged coupling 82, which is adapted to be connected to the mechanism to be driven, such as, for example, the propeller shaft of a motor driven vehicle.

The fluid brake

The gears 74 and 75 also function as the pressure creating elements of a fluid brake. The gears 74 and 75 are located within the recessed portion 83 of the casing 84 of the fluid brake mechanism, said casing being secured by means of suitable fastening devices to the casing 1.

The casing 1 is adapted to contain a lubricant indicated at 85, see Figures 2 and 3, and this lubricant serves as a source of supply for the fluid brake. The casing 84, see Figure 3, is provided with a passage 86, one end of which communicates with the chamber or recess 83, at 87, while the other end opens into the chamber or recess 88 and is controlled by means of a balanced valve 89. The valve 89 consists of a cup-shaped sleeve secured to a valve rod 90, and is provided with ports 91, see Figure 5, in order to balance the pressure acting on the valve. The valve stem 90 is provided with a rack 92 which meshes with a pinion 93, with which latter also meshes the teeth of a rack 94, which is connected at its outer end by means of a pin and slot connection 95, with an elbow lever 96, which is adapted in any desired manner to be controlled by the operator. The chamber 88 communicates with an inlet passage 97, having a valve seat 98, with which co-operates a check valve 99.

The portion of the chamber 88 through which the valve 89 passes is enlarged, as indicated at 100, see Figure 5, so that, when the valve 89 is in its extreme forward position, the fluid due to the suction created, can pass from the fluid supply 85 through the inlet passage 97 into the chamber 88. The inlet passage 97 communicates by a by-pass 101, which opens into an inlet passage 102 which is provided with a seat 103, which is controlled by means of a valve 104, having a larger pressure area 105, which is open to the pressure in the passage 102 and thereby in the passage 86. The rear end of the valve stem 106 passes through a gland 107 and is provided with a nut 108 against which bears one end of a spring 109, the opposite end of which bears against a cap 110, so that the tendency of such spring is to normally maintain the valve 104 in its closed position, as seen in Figure 3. The inlet passage 102 is provided with a valve seat 111 with which co-operates a check valve 112. The valve 89 is slidable in a differential bushing 113, seated in a differential aperture in the casing 84, and locked in position by means of a valve head 114 secured to the housing in any desired manner. The casing 84 has connected to it a cover plate 115, see Figures 1 and 4, which closes the side of the chamber 83, and also serves to support the gear casing 71 and the various shafts journalled therein, as will be readily understood by reference to Figure 1.

The gear or pumping elements 74 and 75 of the fluid brake are provided with the balancing ports 116 and 117, respectively. In Figure 3 for clearness of illustration, I have only shown a few of those balancing ports or passages, but, in practice, oppositely disposed spaces between juxtaposed teeth of each gear are intercommunicating by means of ports through which the fluid can pass and thus reduce the strain on the bearings of the gears 74 and 75.

The controlling mechanism

The controlling mechanism is shown in Figures 10 to 12 inclusive, and to these figures reference is now directed. 118 designates the clutch pedal to the lever of which is connected a rod 119, which is operatively connected in the usual manner to the service brake of the motor vehicle. This rod is guided in a bracket 120 and has fixed to it a finger 121 through which is freely slidable a rod 122, which is connected to the bell crank lever 96, see also Figures 1 and 5. The rod 122 has adjustably fixed to it the collars 123 and 124 disposed on opposite sides of the finger 121. Between the collar 123 and the finger 121 is disposed a spring 125 and in a similar manner, between the finger 121 and the collar 124 is disposed a spring 126. I provide for locking the clutch pedal in any position to which it is moved inwardly and for this purpose, I have shown in Figure 10 an arm 127 having a pin and slot connection with a spring pressed pawl 128 which co-operates with a stationary ratchet 129. The clutch pedal is loosely mounted on a shaft 130, which shaft actuates the main clutch (not shown) of the machine, which is mounted on the main drive shaft 6, as before explained.

In order to give the shaft 130 a different angular movement from that of the clutch pedal 118, the lever of such pedal is connected by means of a series of links 131 to an arm 132, which is fixed on the shaft 130 which controls the main clutch.

133 designates a rod which is operatively connected with the reversing mechanism in any desired manner. 134 designates a rod which is operatively connected with the back gearing in any desired manner. 135 designates a rod which is operatively connected with the mechanism for forming a direct drive from the driving shaft to the driven shaft. These control rods 133, 134 and 135 are guided in the casing 1 and also in a bracket 136, see Figure 10. The rod 133 has fixed to it a safety dog 137, the lower end of which is reversely inclined as at 138. A return spring 139 is interposed between the dog 137 and a member of the bracket 136.

It will be clear from Figure 11 that each of the rods 134 and 135 is provided with a tension device, similar to that provided for the rod 133 as shown in Figures 10, 11 and 12, so that a detailed description of each of these is believed to be unnecessary, the rod 134 having a tension device 140 and the rod 135 having a tension device 141.

I provide means to co-operate with the dog 137, in the form of a bar 142 fixed to a rock shaft 143 supported by bracket 136 and to which is connected a rock arm 144, which is connected by means of a link 145 with the lever of the clutch pedal 118.

It will thus be seen that unless the controlling rods 133, 134 and 135 are in their proper position, the clutch pedal is rendered inoperative, and is maintained in its outward or normal inoperative position.

I provide means for preventing more than one controlling rod being operated at the same time, and for returning the other rods to their neutral position by the movement of the controlling rod which is being actuated.

146 designates a stationary support on which are pivoted the levers 147, 148 and 149. The rod 135 is provided with a depending pin 150 adapted to co-operate with the levers 148 and 149. The rod 134 is provided with a pin 151 adapted to co-operate with the lever 147 and with a pin 152 adapted to co-operate with the lever 149. The rod 133 is provided with a pin 153, which co-operates with the lever 147, and is also provided with a pin 154, which co-operates with the lever 148. The reverse controlling rod 133 is provided with a clutch arm 155 which controls the reverse gear 80. The lever 135 is provided with an arm 156 which controls the gear 77. The rod 134 is provided with an arm 157 which controls the clutch gear 73.

158 designates an emergency brake and shift pedal which is pivotally supported at 159 on a block 160 so as to have a lateral movement and this block 160 is loosely mounted on a stud shaft 161 and is provided with the extension 162 against which bears a spring 163, so that the tendency of such spring is to retain the shift pedal 158 in its upward position. The shift pedal 158 is connected to the extension 162, which in turn is connected to the emergency brake of the motor vehicle by means of rod 164.

It will now be understood that depending upon the position of the shift pedal 158, it will bear against one of the levers 133, 134 and 135. The bracket 136 has fixed to it the fork 165 having the arms 167, 168, 169 and 170. The arm 170 is recessed to form a shoulder 171 to receive the brake and shift pedal 158, and, in a similar manner, the arm 167 is recessed to form a shoulder 172 to receive the brake and shift pedal 158 and retain it in its extreme outward position at such location.

It will be noted that the arm 168 is longer than the arm 169, so that the emergency brake will be applied before one can shift from reverse to a forward speed or vice versa. The arm 169 is shorter so that one can shift from one forward speed to another without applying the emergency brake.

The operation of my novel transmission and the controlling mechanism therefor will now be apparent to those skilled in this art and is as follows:

Assuming now that my invention is applied to a motor vehicle and it is desired to start the automobile, the operation is as follows:—

In the normal operation of the device, the brake and shifting lever 158 will be positioned between the arms 168 and 169 and will press in the controlling rod 135 due to the action of the spring 163, see Figure 10. The controlling rods 133 and 134 will be in their forward position. When the controlling rod 135 is in this position, it will be apparent from Figure 1, that the gear 77 is in mesh with the internal gear 76, so that there will be a direct drive between the auxiliary shaft 55 and the main driven shaft 7. The normal position of the clutch pedal at this time is a forwardly advanced position from that seen in Figure 10, since the main clutch carried by the main drive shaft 6 is at this time declutched. The operator now places his foot on the clutch pedal 118 pressing down the rearward portion, and thus disengaging the pawl 128 from its ratchet 129.

If the operator now permits the clutch pedal 118 to move towards him this will cause the main clutch to become engaged and the car is started. If however, the control rods 133 and 134 are not in their proper position, then, due to the provision of the bar 142, the rock shaft 143, rock arm 144 and link 145, the clutch pedal 118 could not move towards the operator, and the car could not be started.

Assuming now that the power being transmitted from the engine or prime mover to the main driving shaft 6, it will be apparent that it will be transmitted to the first governor unit driven thereby.

The governor weights 21 of the first governing unit will be in their inward positions and will be retained therein by the locking plungers 32, so that the drive will be through the reduction gearing of the first governor unit. Each governor unit is of the same construction and to avoid repetition, I have only illustrated and described in detail the second governor unit. It will, however, be understood that the first governor unit drives the auxiliary driven shaft 52 in precisely the same manner as the second governor unit drives the shaft 55 and that the second governor unit is driven and also controlled by the first governor unit.

The drive is now being effected through the reduction gearing of each governor unit and the gear 77 splined to the shaft 55 is in mesh with the gear 76 of the main driving shaft 7. It will be understood at this point that the first governor unit is driven at engine speed, and the second governor unit, driven through the reduction gearing of the first governor unit, is turning at a somewhat slower speed therefore the first governor will act before the second. As the engine increases its speed, the tendency of the governor weights is to fly outwardly due to centrifugal action.

The gear drum 58 as before explained is provided with a brake band 60 which has the function of a silent ratchet. The gear drum 58 at this time has a tendency to turn in a counter-clockwise direction, as viewed in Figure 6, which will cause an outward movement of the links 53 and 65, which will tend to tighten the band 60 around the gear drum, and thus hold it stationary, so that the drive takes place through the reduction gearing from the pinion 46 through the gear 56 which is fast on the shaft 55, and therefor drives it at a reduced speed.

When a certain speed, depending upon the adjustment of the springs 35, see Figure 8, is reached, the resistance of the locking plungers 32 will be overcome, and the governor weights 21 will travel with a rapid and uninterrupted movement to their extreme outward positions, as will be understood from Figures 7, 9 and 13. This outward movement of the governor weights 21 due to the manner in which they are retained in their inward position, will take place very rapidly, without any lag and without their stopping at any intermediate position. As soon as the governor weights 21 reach their outward position they are locked by the locking plungers 37. Due to the equalizing mechanism provided, the governor weights of a governor unit have an equal and simultaneous movement. This outward movement of the governor weights 21 actuates the links 14, see also Figure 1, thereby moving inwardly a pressure transmitting member 49, which transmits the pressure through the spring 54 to the pressure transmitting member 45, thereby to the disc of the clutch 47, and thereby directly connecting the shafts 52 and 53 so that they revolve in unison and at the same speed.

Each governor unit operates in precisely the same manner, the first governor unit coming first into operation, and as the speed increases the second governor unit will be brought into operation. In some cases, only one governor unit may be necessary, but in the larger types of motor vehicles two or more governor units may be employed, if desired, and where a plurality are employed they are connected in series. If the car slows down the centrifugal action on the weights becomes less, and the return springs 30 will finally overcome the holding action of the locking plunger 37 and will return the governor weights 21 to their initial inward position, in which position they will be locked by the locking plungers 32. This causes a release of the cutch 47 and causes the drive to be resumed through the gear 46 and the reduction gear 57. In this manner a direct drive is obtained, or a drive through the reduction gear

*The operation of the fluid brake*

As before explained, the gears 74 and 75, which act as a portion of the back gearing and also as pressure creating or pumping elements are fixed to their respective shafts.

Assuming that the car is now running at any desired speed and it is desired to slow down or stop, the fluid brake is operated, the clutch pedal 118 is operated to effect the declutching of the main clutch and as this clutch pedal is moved downwardly, the rod 119 will be moved forwardly but not sufficiently to operate the service brake. This forward movement of the controlling rod 119 by means of the connecting finger 121 and the spring 125 and the set collar 123 causes a forward movement of the rod 122 thereby rocking the bell crank lever 96 on its fulcrum and acting the rack 94 which through the pinion 93 co-operates with the rack 92 to move the valve 89 into its closed position. This shuts off the communication between the chamber 88 and the passage 86, so that a pressure is built up within the chamber 88 which reacts against the teeth of the gear 75 and also 74 and thus has a retarding action on the gear 75 and the main driven shaft 7 to which it is connected. If this pressure built up in the chamber 88 becomes excessive, it will, acting through the by-pass 101, move the valve 103 outwardly, so that the passage 86 will be in communication with the chamber 88 until the pressures are substantially balanced or the pressure in the chamber 88 is less than that exerted by the spring 109. It will thus be seen that the provision and action of the valve 103 and its spring 109 will compensate for and overcome any shock which would otherwise be present in case the fluid brake was applied.

It will be seen that excessive wear and strain on the teeth of the gears 74 and 75 and on the journals of such gears is reduced to a minimum on account of the provision of the balancing ports or passages 116 and 117, which permit the fluid in the chamber 88 to pass through such gears to opposite faces between the teeth thus effecting a balance of pressure acting diametrically on the gear teeth. The wear of the valve 89 is reduced and its tendency to stick eliminated, and, due to its novel construction, the pressures are balanced on opposite ends of it. This fluid brake can operate equally well when revolved in either direction, as the valve 103 serves as a safety valve.

If the pressure builds up in the passage 86 sufficiently to overcome the pressure of the spring 109, the pressure in the chamber 86 and inlet passage 102 acting on the shoulder 105, which is of greater pressure area than that of the rear portion of the valve 103, will cause the valve to open, thereby opening communication between the passage 86 in which the pressure has been built up, and in the chamber 88. If there is any leakage of fluid, it will be apparent that when the fluid brake is operated in one direction a vacuum will be produced which will cause the fluid to pass from the source of supply 85 through the inlet passage 102 into the passage 86. It will thus be seen that the proper amount of fluid will always be maintained in the fluid brake, and, in practice, it will be substantially filled with the fluid, which is preferably a lubricant, so that it can also be employed to effect the lubrication of all of the moving parts contained within the casing 1.

On the further downward movement of the clutch pedal 118, a further forward movement of the controlling rod 119 will be effected, and the service brake will be brought into action. If the operator desires, he can lock the clutch pedal 118 in any position to which it has been adjusted.

By adjusting the set collars 123 and 124, the time at which the fluid brake is thrown into and out of operation can be varied as may be desired in practice. If any emergency arises, or as required, the operator can operate the emergency brake by moving forwardly the brake and shifting pedal 158. He also has under his control, by means of this brake and shifting pedal 158, the reversing mechanism and the back gearing which is in series with the automatic governor units. The back gearing in motor vehicles of the pleasure car type would be used only in an emergency but could be used in trucks as a full load gearing.

If the operator moves the emergency brake and shifting pedal 158 into the position shown in Figure 10, he operates the controlling rod 134 and thereby the arm 157 to move the clutch 73, see Figure 1, into mesh with the gear 72, thus throwing into action the back gearing from the gear 68 to the shaft 7.

As before explained, when one of the control rods 133, 134 or 135 is actuated, the others of said control rods are rendered inactive or, in other words, are moved to their neutral or initial position. If more than one of the control rods 133, 134 or 135 were in their operative positions, then the link 145 connected as explained, would prevent the operation of the clutch pedal 118 until the proper adjustment of these controlling rods had taken place.

The manner in which the reversing mechanism is controlled has already been explained.

The brake and shifting pedal 158 will be held in its adjusted position when resting on the arm 168, or on the shoulders 171 and 172, but it is not locked, and can at any proper time be shifted from one position to the other, but it will be understood that the shifting of gears does not take place until the clutch pedal has been properly adjusted.

It will now be apparent that I have devised a new and useful controlling mechanism for transmissions which embodies the features of advantages enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. Motor driven mechanism and controlling mechanism therefor, comprising the combination with a clutch pedal, a service brake and main clutch controlled thereby, of a transmission including reverse gearing, means to control the different forward speeds, and an emergency brake and gear shift pedal controlling said reverse gearing and said means, and an emergency brake controlled by said emergency brake and gear shift pedal.

2. Motor driven mechanism and controlling mechanism therefor, comprising the combination with a clutch pedal, a service brake and main clutch controlled thereby, of a transmission including reverse gearing means to control the different forward speeds, control rods for said reverse gearing, an emergency brake and gear shift pedal controlling said reverse gearing and said means, and an emergency brake controlled by said emergency brake and gear shift pedal, and connections between said clutch pedal and said emergency brake and gear shift pedal whereby said clutch pedal cannot be operated unless said control rods are in a proper position.

3. Motor vehicle controlling mechanism, comprising in combination with the service brake, an auxiliary brake, and a main clutch, of a clutch pedal controlling said service brake, auxiliary brake and main clutch, an emergency brake, a transmission including reverse gearing, and means to control the different forward speeds, and an emergency brake and gear shift pedal controlling said reverse gearing and the means for controlling said different forward speeds.

4. Motor vehicle controlling mechanism, comprising a service brake, a driven shaft, an auxiliary brake controlling said driven shaft, a controlling rod for said auxiliary brake, resiliently connected with the controlling rod for said service brake, and a pedal controlling the rod for said service brake.

5. Motor vehicle controlling mechanism, comprising a service brake, a driven shaft, an auxiliary brake controlling said driven shaft, a controlling rod for said auxiliary brake adjustably and resiliently connected with the controlling rod for said service brake, and a pedal controlling the rod for said service brake.

6. Controlling mechanism for motor vehicles, comprising a service brake, an auxiliary brake, a clutch pedal to operate said brakes, a pawl and ratchet for said clutch pedal, a main clutch, a shaft on which said clutch pedal is loosely mounted, and connections between said clutch pedal and said shaft.

7. In a motor vehicle, a clutch pedal, a service brake and an auxiliary brake controlled thereby, a second pedal, an emergency brake, reverse gearing and forward speed changing gearing controlled by said second pedal, and connections between said pedals whereby one can be actuated only when the other has a predetermined adjusted position.

MATTHEW STUCATUR.